United States Patent
Murakami et al.

[11] Patent Number: 6,154,514
[45] Date of Patent: Nov. 28, 2000

[54] NUCLEAR REACTION FUEL ASSEMBLY FOR A NUCLEAR REACTOR FUEL ASSEMBLY

[75] Inventors: Kazuo Murakami; Shinichi Shiraishi; Kiyoshi Izumi, all of Hyogo, Japan

[73] Assignee: Mitsubishi Heavy Industries, Ltd., Tokyo, Japan

[21] Appl. No.: 09/132,475

[22] Filed: Aug. 11, 1998

[51] Int. Cl.[7] .................................. G21C 19/06
[52] U.S. Cl. .................. 376/364; 376/434; 376/438; 376/442; 376/446
[58] Field of Search .................. 376/442, 438, 376/434, 364, 446

[56] References Cited

U.S. PATENT DOCUMENTS

| | | | |
|---|---|---|---|
| 4,671,924 | 6/1987 | Gjertsen et al. | 376/285 |
| 4,792,429 | 12/1988 | Hatfield | 376/446 |
| 4,938,919 | 7/1990 | Rylatt | 376/446 |
| 4,986,960 | 1/1991 | Larson | 376/446 |
| 5,053,191 | 10/1991 | Bryan et al. | 376/446 |
| 5,057,272 | 10/1991 | DeMario et al. | 376/446 |
| 5,133,926 | 7/1992 | Doshi et al. | 376/445 |
| 5,271,053 | 12/1993 | Bryan | 376/364 |
| 5,274,685 | 12/1993 | Yates | 376/364 |
| 5,276,721 | 1/1994 | Beuerlein | 376/446 |
| 5,812,624 | 9/1998 | Burfin et al. | 376/364 |

FOREIGN PATENT DOCUMENTS

| | | | |
|---|---|---|---|
| 60-39152 | 2/1985 | Japan | 376/446 |
| 2-195295 | 8/1990 | Japan | 376/364 |
| 2-221893 | 9/1990 | Japan | 376/364 |
| 3-012590 | 1/1991 | Japan | 376/364 |
| 6-249986 | 9/1994 | Japan | 376/364 |
| 2-626867 | 7/1997 | Japan | 376/364 |
| 10-239475 | 9/1998 | Japan | 376/364 |

*Primary Examiner*—Charles T. Jordan
*Assistant Examiner*—Jack Keith
*Attorney, Agent, or Firm*—Sughrue, Mion, Zinn, Macpeak & Seas, PLLC

[57] ABSTRACT

An upper hold-down spring structure for a nuclear reactor fuel assembly. A hold down spring 20 mounted on an upper surface of an upper nozzle 11 of a fuel assembly for a pressurized water reactor is composed of an upper plate spring 21 having plastic spring characteristics and a lower plate spring 23, base ends of which are fixed with a fastening bolt 18 at a common position. The upper spring 21 and the lower spring 23 are made of precipitation hardened nickel base alloy and the thickness of the springs are determined so as to keep the stresses generated less sensitive to stress corrosion cracking.

2 Claims, 5 Drawing Sheets

NUCLEAR REACTION FUEL ASSEMBLY FOR A NUCLEAR REACTOR FUEL ASSEMBLY

FIELD OF THE INVENTION

This invention relates to the structure of a fuel assembly for a nuclear reactor, and in particular, to the structure of a hold-down spring mounted on an upper nozzle of the fuel assembly for a pressurized nuclear reactor.

BACKGROUND OF THE INVENTION

A fuel assembly commonly used in a pressurized water reactor comprises, in general, an upper and lower nozzle facing each other with a space therebetween, a plurality of hollow guide tubes for control rods extending parallel to and spaced apart from one another between these nozzles, both ends of the guide tubes being secured to the nozzles, a plurality of fuel rod support grids mounted on the guide tubes and disposed so as to be spaced apart from one another along the length of the tubes, and a plurality of fuel rods extending through and supported by these fuel rod support grids, the fuel rods extending in parallel to and spaced apart from one another. The fuel rods are arrayed with spaces between one another in orthogonal directions, that is, in the row and line direction of the grid. Thus, the fuel assembly is called a 17×17, 15×15, etc. type according to the number of the lines and rows.

Further, such fuel assemblies are positioned and loaded on a lower core plate in a nuclear reactor vessel while the upper portion thereof is held by an upper core plate. Thus, during operation of the nuclear reactor, since the reactor coolant after flowing in through many flow holes in the lower core plate, passes through a lower nozzle, flows upwards along the fuel rods, and further flows upwards through the upper nozzle, the fuel assembly experiences an upward coolant flow force. On the other hand, a thermal expansion difference is generated between an in-core structure including the upper and lower core plate and the fuel assembly; and further, the fuel assembly grows or its length increases from the exposure to neutrons. Accordingly, a hold-down spring is fitted onto the upper nozzle and used to accommodate changes in length such as thermal expansion differential, etc. and for holding the fuel assembly at its designed position against the coolant flow force.

A conventional structure of a hold-down spring used in a so-called 17×17 type fuel assembly is shown in FIG. 4. In the drawing, a hold-down spring 1 is a composite spring comprising two lower springs 3 and one upper spring 5 and the base ends thereof are fastened with a fitting bolt 7 onto an upper surface of the upper nozzle 9 of the before mentioned fuel assembly. As seen in the detailed drawing of FIG. 5, at a distal end portion of the lower springs 3 a slot 3a extending in a lateral direction is cut out, through which a vertically oriented portion 5a of the upper spring 5 extends. The vertically oriented portion 5a of the upper spring 5 is connected through a bent portion 5b to a main body thereof and an abutting ledge 5c is shaped at the lower end of the bent portion 5b. Thus, the upper spring 5 which can bend in a vertical direction comes into contact with an upper surface of a lower-spring 3 at the abutting ledge 5c after an initial deformation, and thereafter the upper spring 5 and the lower springs 3 make their deformation as one structure. In other words, the hold-down spring 1 has non-linear characteristics while the upper spring 5 has plastic spring characteristics as illustrated in FIG. 6. Such spring characteristics are employed after allowing for increases in the overall length of the fuel assembly accompanying an increased burn-up of the fuel assembly or accumulated operating hours, and thermal expansion differential between an in-core structure and the fuel assembly during operation (hot state). In-addition, considering the operating environment and the stress resistance needed, a precipitation hardened nickel base alloy is used as the material for the hold-down spring 1.

SUMMARY OF THE INVENTION

As to the above mentioned conventional hold-down spring maximum stress is generated at a base portion close to the base end fastening portion. This stress is relatively high and hence there is a fear of stress corrosion crack occurring from the high temperature conditions in the nuclear reactor and the characteristics of the material used.

Accordingly, an object of the present invention is to provide an upper hold-down spring of a fuel assembly for a nuclear reactor which is free from the occurrence of stress corrosion cracking but still securely provides the required spring force.

In order to solve the above described problem, according to the present invention, an upper hold-down spring fitted on an upper nozzle of a fuel assembly for the nuclear reactor which is composed of an upper and lower nozzle spaced apart from and facing each other, a plurality of hollow guide tubes each extending in parallel to and spaced apart from one another between the nozzles and secured at opposite ends thereof to the nozzles, a plurality of fuel rod support grids each firmly mounted at the hollow guide tubes and disposed so as to be spaced apart from one another in a lengthwise direction and a plurality of fuel rods each being placed through and supported by the fuel rod supported grids, each of the fuel rods extending in parallel to and spaced apart from one another comprising one upper spring with plastic characteristics and one lower plate spring, both of which are made of a precipitation hardened nickel base alloy with the thicknesses thereof designed with stress value that less sensitive to stress corrosion cracking.

DETAILED DESCRIPTION OF THE PREFERRED EMBODIMENT

Figure 2:
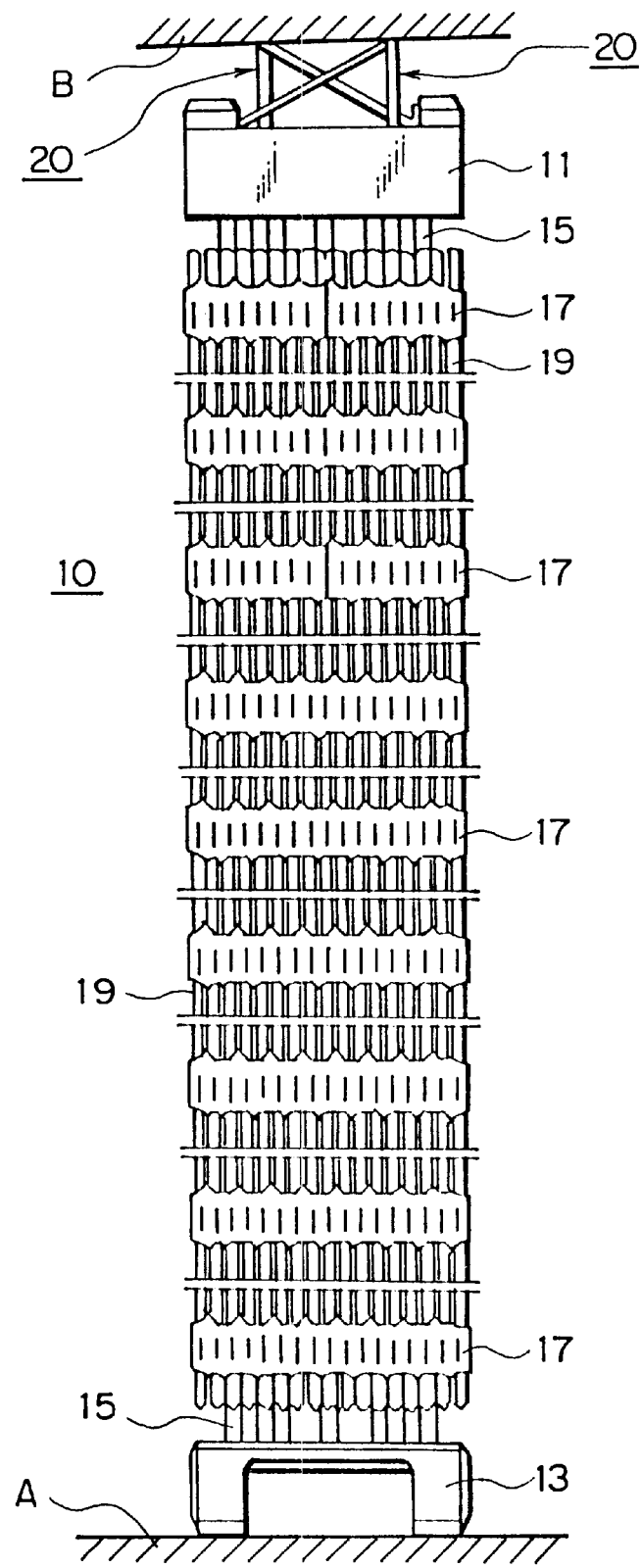
FIG. 2 is a shortened sectional elevational view of a fuel assembly of the embodiment.

A preferred embodiment of the invention is described hereinafter with reference to the attached drawings. First, the structure of a fuel assembly 10 will be described referring to FIG. 2. In FIG. 2, the fuel assembly 10 is shown in a state where it has been placed between a lower core plate "A" and an upper core plate "B" and an upper nozzle 11 of the before described construction and a lower nozzle 13 placed on the lower core plate "A" are connected to each other with a plurality of hollow guide tubes 15. The hollow guide tubes 15 are generally used to guide control rods (not shown), to which a plurality of control rod support grids 17 positioned with a distance between one another in the lengthwise direction, are secured. These support grids 17 have grid openings located in 15 lines and 15 rows and a plurality of fuel rods 19 are individually placed through the many openings which do not receive the hollow guide tubes 15 and are thereby supported by the support grid 17. In addition, the hold-down springs 20 are fitted on an upper surface of the upper nozzle 11 along two parallel side edges in a conventional manner.

Figure 1:
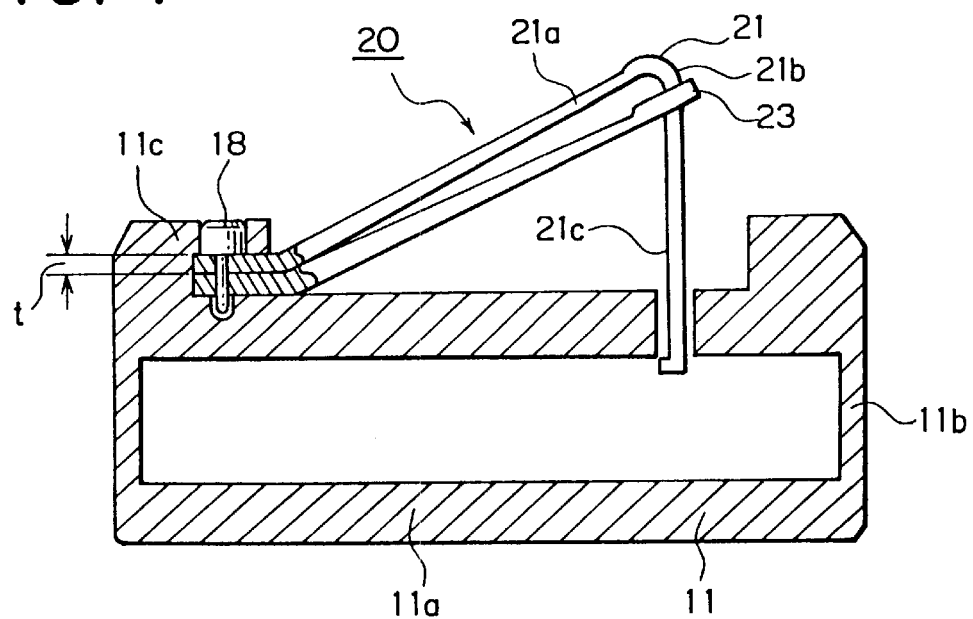
FIG. 1 is a partially sectional elevational view showing an essential portion of a preferred embodiment of the invention.
Figure 4:
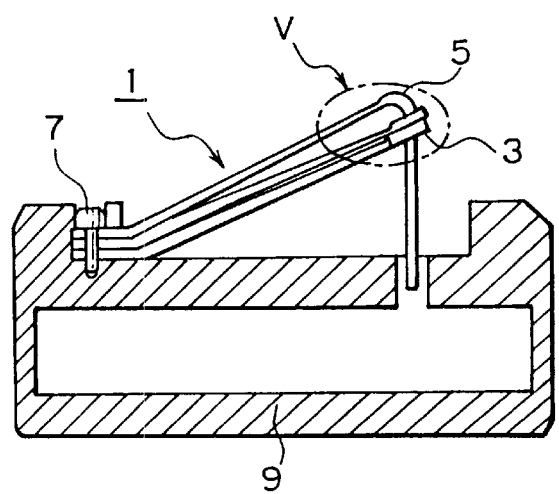
FIG. 4 is a partially sectional elevational view partially showing the structure of a conventional hold-down spring.
Figure 5:
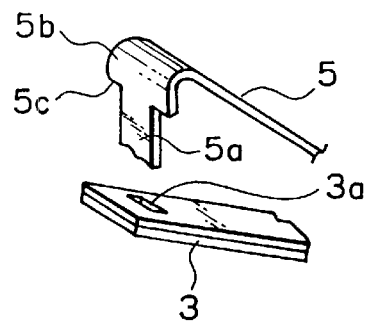
FIG. 5 is a partial perspective view showing a portion designated by the letter V in FIG. 4.
Figure 1A:
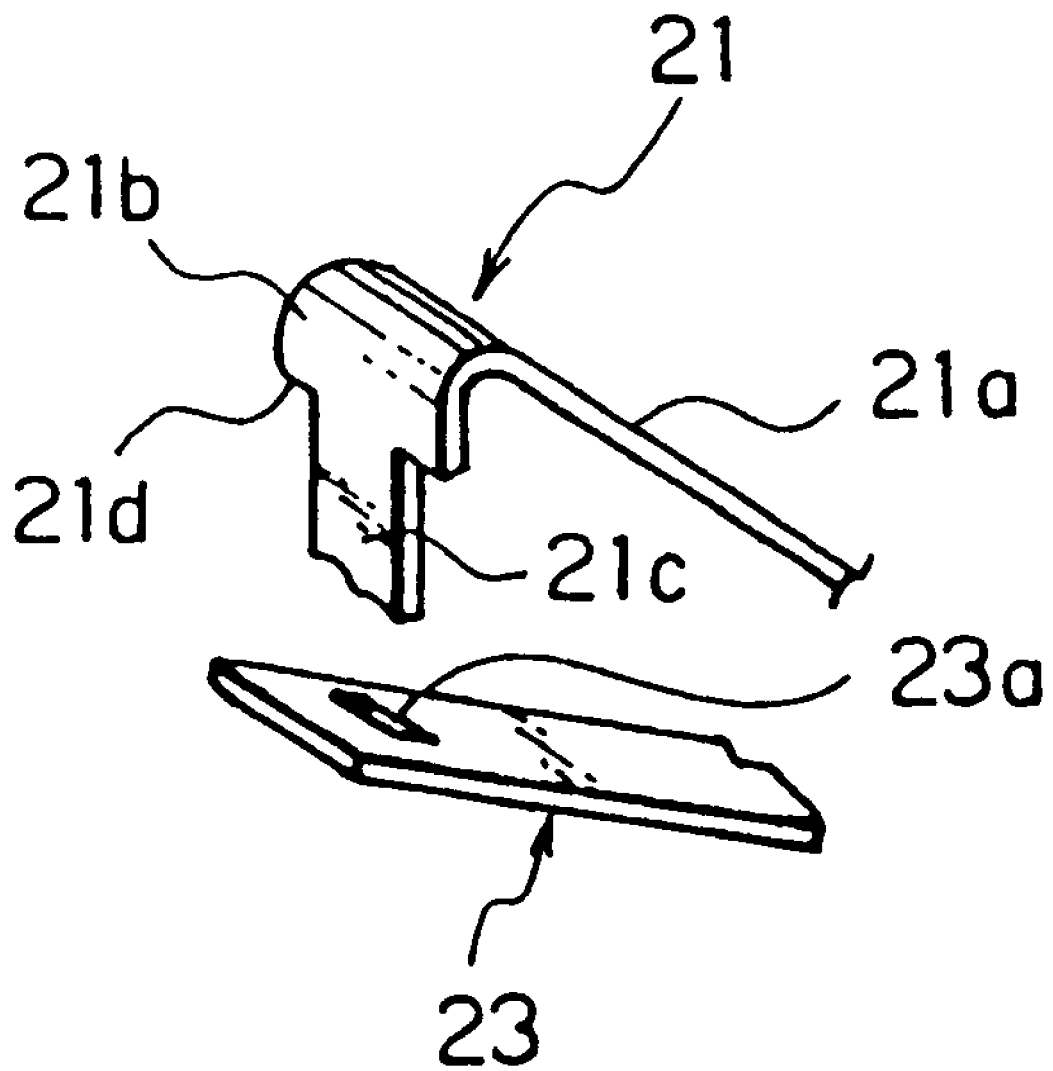
FIG. 1a is a partial perspective view showing the essential portion of the preferred embodiment.

Referring to FIG. 1, the structure of the hold-down spring 20 will be further described in detail. In FIG. 1, the upper nozzle 11 has a generally rectangular nozzle plate 11a in which a number of coolant flow holes are distributively machined, and a box-shaped side wall 11b extending upward from the circumferential edge of the nozzle plate 11a. A base end of the hold-down spring 20 is fastened and secured with a fitting bolt 18 at a holding section 11c formed on an upper corner section of the side wall 11b. The hold-down spring 20 is composed of an upper spring 21 and a lower spring 23 and the upper spring 21 is a plate spring with a generally constant width and fabricated by being shaped from a blank of Inconel 718 (trade name) or a precipitation hardened nickel base alloy. Further, as clearly shown in FIG. 1a in particular, the upper plate spring 21 has a main body 21a, a bent portion 21b and a vertically oriented portion 21c. The lower plate spring 23 has a slot 23a extending widthwise at its distal end portion for receiving the vertically oriented portion 21c. Thus the upper and lower plate spring 21, 23 are combined with each other so as to form the upper hold-down spring 20 as shown in FIGS. 1 and 1a. As also shown in FIG. 1a, the upper plate spring 21 has an abutting ledge 21d which comes contact with an upper surface of the lower plate spring 23 after an initial deformation and thereafter the upper and lower plate spring 21, 23 work as an integral spring means.

Figure 3:
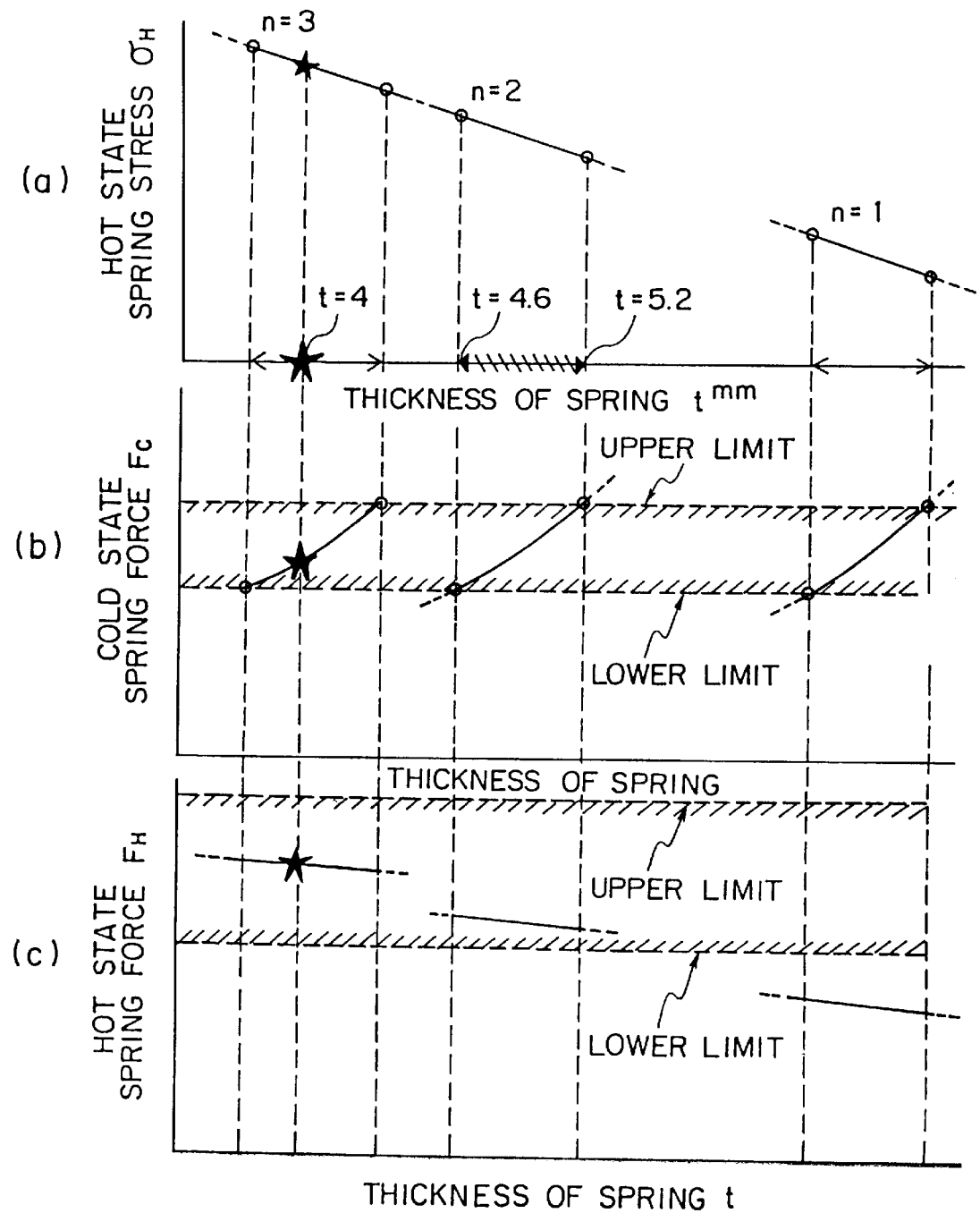
FIG. 3 is a graph for explaining the functioning of the present invention.
Figure 6:
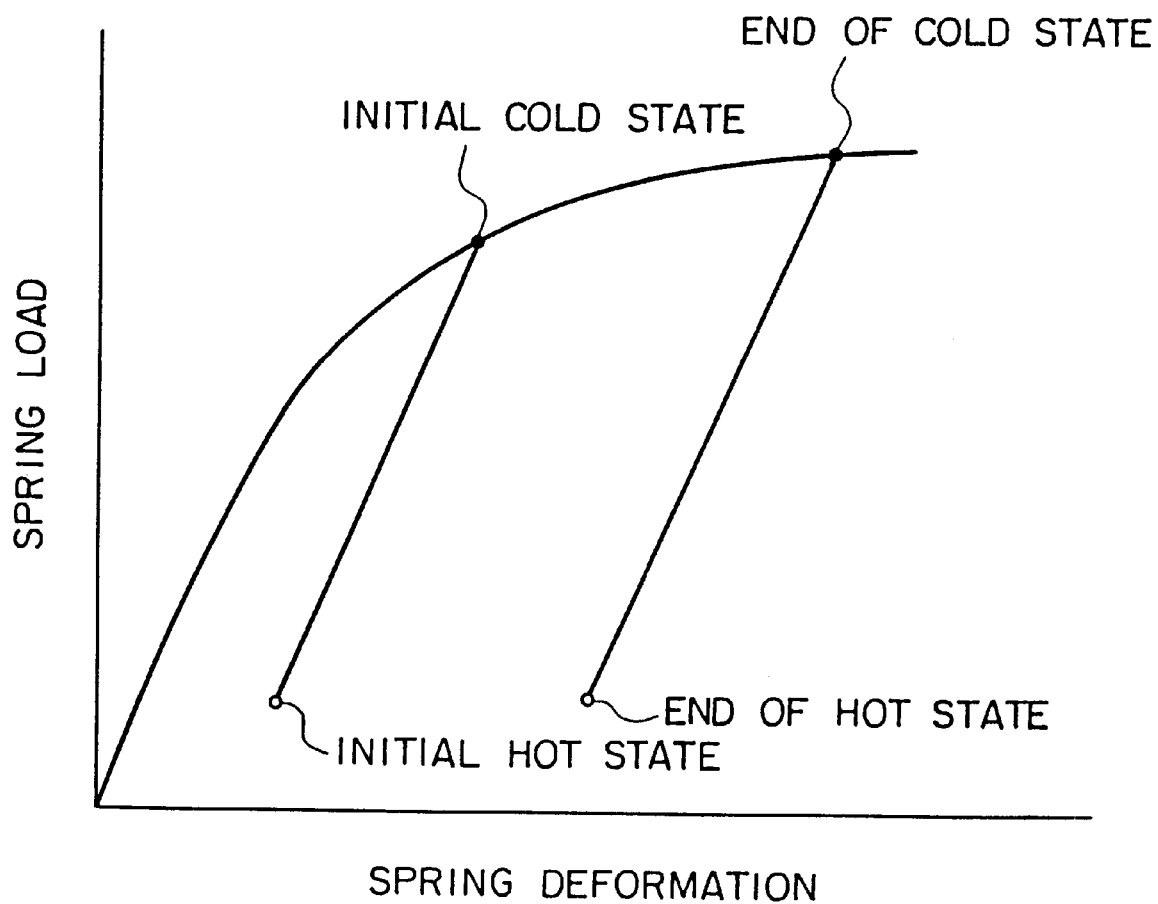
FIG. 6 is a graph showing the characteristics of a spring with a conventional structure.

When the fuel assembly 10 equipped with the hold down spring 20 constructed in the above described manner is loaded in the core of a nuclear reactor in the state shown in FIG. 1, an initial deformation 20 is imparted to the hold-down spring. Since in such a cold state, the reactor coolant is forced to flow through the core by a coolant pump, the degree of the initial deformation is determined from its spring characteristics so as to withstand a floating force acting on the fuel assembly 10. Further, when the nuclear reactor reaches power operation and a "hot" condition, the thermal expansion of the inner core structure including the lower core plate "A" and the upper core plate "B" becomes relatively larger resulting in a decrease in the deformation of the spring. The relationship among the cold state spring force $F_C$, the hot state spring force $F_H$ and the hot state spring stress $\sigma_H$ which correspond to such deformation and spring thickness t is illustrated in FIG. 3. In order to comprehensively show a state in which these relationships change with the number of spring plates n as a parameter, cases in which n equals 3 (conventional structure) and n equals 1 are also illustrated as references. In addition, in a graph of the cold state spring force $F_C$ and the hot state spring force $F_H$, the lower and upper limit values are determined by the force needed to prevent the rise of the fuel assembly 10 and the limit permissible in view of the strength of the upper nozzle, respectively.

As is evident from FIG. 3, the hold-down spring 20 (n=2) of the preferred embodiment according to the present invention satisfies the required conditions for the cold state spring force $F_C$ and the hot state spring force $F_H$ in the range where the thickness t of the spring is 4.6~5.2 mm, and the cold state spring stress $\sigma_H$ is also confined in a range where the sensitivity to stress corrosion cracking is small. Moreover, in the conventional structure (n=3, indicated by stars in the drawing), the thickness t of the plate spring is 4.0 mm which satisfies the required conditions of the cold state spring force $F_C$ and the hot state spring force $F_H$, but the hot state spring stress $\sigma_H$ is relatively large. Though it is possible to decrease the number n of plate springs to 1 so as to further lower the hot state spring stress a $\sigma_H$, such an option satisfies the requirements of the cold state spring force $F_C$, but does not satisfy those of the hot state spring force $F_H$. As a result, such an option is not suitable.

Furthermore, in the above described preferred embodiment, since the upper plate spring 21 has the same plastic spring characteristics as the conventional spring, the hot state spring stress $\sigma_H$ will not vary significantly when the fuel assembly 10 grows under exposure to neutrons.

As described above, according to the present invention, the suitable number of plate springs constituting the hold-down spring fitted onto the upper nozzle of the fuel assembly is established as two (2), and the thickness of the plate spring is set in a suitable range thereby lowering the hot state spring stress $\sigma_H$ and the sensitivity to stress corrosion cracking. As a result, the fuel assembly can be held down and kept at the predetermined suitable position during operation of the reactor and stress corrosion cracking can be prevented.

What is claimed is:

1. A structure of an upper hold-down spring of a fuel assembly for a nuclear reactor, the fuel assembly comprising:

an upper and lower nozzle spaced apart form and facing each other;

a plurality of hollow guide tubes each extending parallel to and spaced apart from each other between the nozzles and secured at both ends thereof to the nozzles;

a plurality of fuel rod support grids each firmly mounted at the hollow guide tubes and spaced apart from each other in the lengthwise direction; and a plurality of fuel rods each extending through and supported by the fuel rod support grids, each of the fuel rods extending in parallel to and spaced apart from each other, wherein the upper hold-down spring which is mounted on an upper surface of the upper nozzle comprises one upper plate spring with plastic spring characteristics and one lower plate spring, said plate springs having base ends, said base ends of the plate springs being fastened at a common position, in which both of the plate springs are made of a precipitation hardened nickel base alloy and a thickness of the plate springs is between 4.6 to 5.2 mm in order to provide a stress value which is less sensitive to stress corrosion cracking.

2. The structure of an upper hold-down spring of a fuel assembly for a nuclear reactor as described in claim 1, wherein the lower plate spring has a slot extending in a lateral direction at a distal end portion thereof, the upper plate spring has a bent portion and a vertically oriented portion with an abutting ledge, and the upper and lower plate spring are assembled such that the vertically oriented portion extends through the slot below the abutting ledge.

* * * * *